(12) United States Patent
Lim

(10) Patent No.: US 12,713,146 B2
(45) Date of Patent: Aug. 18, 2026

(54) IMAGE SENSOR INCLUDING SPLIT PHOTODIODE PIXEL WITH LOW NOISE

(71) Applicant: SAMSUNG ELECTRONICS CO., LTD., Suwon-si (KR)

(72) Inventor: Jungwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 280 days.

(21) Appl. No.: 18/672,977

(22) Filed: May 23, 2024

(65) Prior Publication Data

US 2024/0430587 A1 Dec. 26, 2024

(30) Foreign Application Priority Data

Jun. 22, 2023 (KR) ........................ 10-2023-0080034

(51) Int. Cl.
*H04N 25/59* (2023.01)
*H04N 25/78* (2023.01)
*H04N 25/76* (2023.01)

(52) U.S. Cl.
CPC ............. *H04N 25/59* (2023.01); *H04N 25/78* (2023.01); *H04N 25/7795* (2023.01)

(58) Field of Classification Search
CPC .... H04N 25/59; H04N 25/78; H04N 25/7795; H04N 25/778; H04N 25/709; H04N 25/77; H04N 25/57; H04N 25/76; H04N 25/772; H04N 25/766; H04N 25/60
See application file for complete search history.

(56) References Cited

U.S. PATENT DOCUMENTS 10,129,487 B2 11/2018 Ayers et al.
10,880,505 B2 12/2020 Toyofuku et al.
11,082,649 B2 8/2021 Takizawa et al.
2008/0112651 A1 5/2008 Cho et al.
2021/0144319 A1* 5/2021 Innocent .............. H04N 25/771
2022/0059588 A1* 2/2022 Lee ................... H10F 39/80377
(Continued)

FOREIGN PATENT DOCUMENTS

CN 108322677 B 5/2020
CN 112312096 B 2/2023
KR 10-0834763 B1 6/2008

*Primary Examiner* — Sinh Tran
*Assistant Examiner* — Zhenzhen Wu
(74) *Attorney, Agent, or Firm* — Sughrue Mion, PLLC

(57) ABSTRACT

An image sensor includes a first photoelectric element, a second photoelectric element having a larger receiving area than that of the first photoelectric element, a first floating diffusion region in which charges generated by the first photoelectric element are stored, a second floating diffusion region, in which charges generated by the second photoelectric element are stored, and which is connected to a gate of a driving transistor, a capacitor selectively connected to the first floating diffusion region based on a readout mode and configured to store charges overflowing from the first photoelectric element, a third floating diffusion region connected to the first and second floating diffusion regions through first and second switch transistors, respectively, a reset transistor, a first end of which is selectively connected to one of plural voltage nodes through a reset node, and a second end of which is connected to the third floating diffusion region.

20 Claims, 15 Drawing Sheets

(56) References Cited

U.S. PATENT DOCUMENTS

| | | | | |
|---|---|---|---|---|
| 2022/0217291 | A1 | 7/2022 | Kim et al. | |
| 2022/0408039 | A1 | 12/2022 | Park et al. | |
| 2024/0015414 | A1* | 1/2024 | Mabuchi | H04N 25/77 |
| 2025/0203232 | A1* | 6/2025 | Iida | H10F 39/8027 |
| 2025/0247635 | A1* | 7/2025 | Qiao | H04N 25/77 |

* cited by examiner

IMAGE SENSOR INCLUDING SPLIT PHOTODIODE PIXEL WITH LOW NOISE

CROSS-REFERENCE TO RELATED APPLICATION

This application claims priority under 35 U.S.C. § 119 to Korean Patent Application No. 10-2023-0080034 filed on Jun. 22, 2023, in the Korean Intellectual Property Office, the disclosure of which being incorporated by reference herein in its entirety.

BACKGROUND

Apparatuses, devices and methods consistent with the present disclosure relate to an image sensor including split photodiode pixels.

An image sensor is a device that converts a light signal into an electrical signal, and includes a charge coupled device (CCD) image sensor, and a complementary metal oxide semiconductor (CMOS) image sensor.

Among CMOS image sensors, an active pixel sensor (APS) transmits charges, which are generated when an optical signal is incident on a photodiode (PD), to a floating diffusion region. A drive transistor converts the potential of a floating diffusion region into a voltage and outputs the voltage to a column line.

Image sensors are developed to reduce a size of a pixel for increasing resolution and to improve dynamic range for the purpose of improving image quality in various illumination environments.

There are various technologies for implementing a high dynamic range (HDR) of an image sensor. One of the various technologies refers to a split photodiode pixel technology.

SUMMARY

It is an aspect to provide an image sensor including split photodiode pixels with reduced noise.

According to an aspect of one or more embodiments, there is provided an image sensor comprising a first photoelectric element having a first receiving area; a second photoelectric element having a second receiving area that is larger than the first receiving area of the first photoelectric element; a first floating diffusion region in which charges generated by the first photoelectric element are stored; a second floating diffusion region, in which charges generated by the second photoelectric element are stored, and which is connected to a gate of a driving transistor; a capacitor selectively connected to the first floating diffusion region based on a readout mode and configured to store charges overflowing from the first photoelectric element; a third floating diffusion region connected to the first floating diffusion region and the second floating diffusion region through a first switch transistor and a second switch transistor, respectively; and a reset transistor, a first end of which is selectively connected to one of a plurality of voltage nodes through a reset node, and a second end of which is connected to the third floating diffusion region.

According to another aspect of one or more embodiments, there is provided an operating method of an image sensor including a pixel, the pixel including a first photoelectric element, a second photoelectric element having a receiving area larger than a receiving area of the first photoelectric element, a plurality of floating diffusion regions, and a plurality of voltage nodes, the method comprising in a high conversion gain (HCG) mode during a readout period of the first photoelectric element, sampling a first reset level signal of at least one of the floating diffusion regions, which is reset to a voltage of a first voltage node providing a low voltage among the plurality of voltage nodes; in the HCG mode during the readout period of the first photoelectric element, sampling a first image level signal of the at least one of the floating diffusion regions; in a low conversion gain (LCG) mode during the readout period of the first photoelectric element, sampling a second image level signal of at least one of the floating diffusion regions; and in the LCG mode during the readout period of the first photoelectric element, sampling a second reset level signal of at least one of the floating diffusion regions, which is reset to the voltage of the first voltage node, wherein, during the readout period of the first photoelectric element, the plurality of floating diffusion regions are electrically coupled differently in the HCG mode and the LCG mode.

According to yet another aspect of one or more embodiments, there is provided electronic device comprising a pixel array in which a plurality of pixels are arranged; and a control circuit configured to transmit a control signal to a plurality of transistors included in a pixel of the plurality of pixels. The pixel includes a first photoelectric element having a first receiving area; a second photoelectric element having a second receiving area larger than the first receiving area of the first photoelectric element; a first floating diffusion region in which charges generated by the first photoelectric element are stored; a second floating diffusion region, in which charges generated by the second photoelectric element are stored, and which is connected to a gate of a driving transistor; a capacitor selectively connected to the first floating diffusion region based on a readout mode and configured to store charges overflowing from the first photoelectric element; a third floating diffusion region connected to the first floating diffusion region and the second floating diffusion region through a first switch transistor and a second switch transistor, respectively; and a reset transistor, a first end of which is selectively connected to one of a plurality of voltage nodes through a reset node, and a second end of which is connected to the third floating diffusion region.

BRIEF DESCRIPTION OF THE FIGURES

The above and other aspects will become apparent by describing in detail various embodiments thereof with reference to the accompanying drawings.

DETAILED DESCRIPTION

Hereinafter, various embodiments of the present disclosure may be described in detail and clearly to such an extent that an ordinary one in the art easily implements the various embodiments.

Figure 1:
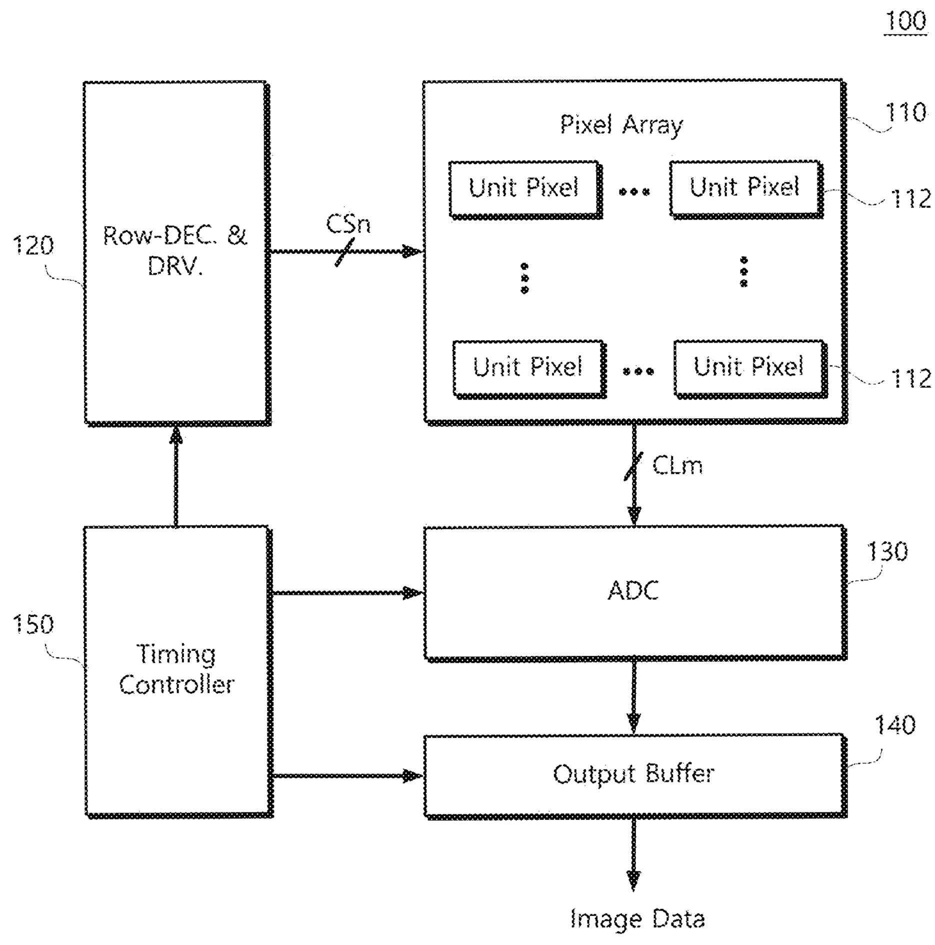
FIG. 1 is a block diagram illustrating an image sensor, according to an embodiment.

FIG. 1 is a block diagram illustrating an image sensor, according to an embodiment. Referring to FIG. 1, an image sensor 100 may include a pixel array 110, a row decoder/driver (Row-DEC. & DRV.) 120, an analog-to-digital converter (ADC) 130, an output buffer 140, and a timing controller 150.

The pixel array 110 includes a plurality of unit pixels 112. For example, the plurality of unit pixels 112 may be arranged in a matrix form. The pixel array 110 may receive a plurality of pixel driving signals (CSn), such as, for example, a select signal, a reset signal, a transfer control signal, a gain control signal, a switch control signal, and a voltage select signal from the row decoder/driver 120. The pixel array 110 operates under the control of the received pixel driving signals (CSn), and each of the unit pixels 112 may convert an optical signal into an electrical signal. The electrical signal generated by each of the unit pixels 112 may be provided to the analog-to-digital converter 130 through a plurality of column lines CLm.

Each of the unit pixels 112 comprises a split photodiode pixel and includes a plurality of photoelectric elements. One photoelectric element included in each of the unit pixels 112 may have a receiving area wider than another photoelectric element. A photoelectric device having a relatively large receiving area may be referred to as a large photodiode (hereinafter referred to as "LPD"). A photoelectric device having a relatively small receiving area may be referred to as a small photodiode (hereinafter referred to as "SPD").

In some embodiments, the photoelectric element may be a photodiode (PD). The photodiode PD is a kind of photoelectric element that generates charges in proportion to the light signal incident from each pixel and accumulates the generated charges. The photoelectric element may be the photodiode PD, a photocapacitor, a photogate, a pinned photodiode (PPD), a partially pinned photodiode, an organic photo diode (OPD), or a quantum dot (QD), or a combination thereof. Various embodiments below are described on the premise that a photoelectric element is the photodiode PD. However, other photoelectric elements described above may be used, and embodiments are not limited to the photodiode PD.

In some embodiments, each of the plurality of unit pixels 112 included in the pixel array 110 may support a dual conversion gain that provides a high conversion gain (HCG) mode and a low conversion gain (LCG) mode. The respective photodiode LPD or SPD may support the dual conversion gain mode. Accordingly, each of the unit pixels 112 may support a total of 4 modes by supporting a HCG mode and a LCG mode depending on the illumination of the incident light for each photodiode LPD or SPD. In other words, for each unit pixel 112, the large photodiode LPD may support both the HCG mode and the LCG mode, and the small photodiode SPD may support both the HCG mode and the LCG mode. Accordingly, the unit pixels 112 may provide a wide dynamic range.

In particular, during a readout operation of the unit pixel 112, a reset voltage provided during the readout of the large photodiode LPD may be different from a reset voltage provided during the readout of the small photodiode SPD. The reset voltage provided during readout of the small photodiode SPD may be provided by a regulator inside the image sensor. Accordingly, even when correlated double sampling is not performed during some of the readout operations of the small photodiode SPD, kTC noise caused by a power supply voltage VDD may be reduced. According to an embodiment, a structure and an operation of each of the unit pixels 112 will be more fully described with reference to drawings below.

Under the control of the timing controller 150, the row decoder/driver (Row-DEC. & DRV.) 120 may select one row of the pixel array 110. To select a row of a plurality of rows, the row decoder/driver 120 may generate a select signal. The row decoder/driver 120 may activate each control signal CSn for unit pixels corresponding to the selected row in an order. In some embodiments, the order may be predetermined. Afterward, a reset level signal, an image level signal, and the like, which are generated from each of the unit pixels 112 in the selected row, may be delivered to the analog-to-digital converter 130.

The analog-to-digital converter (ADC) 130 may convert the reset level signal and the image level signal into a digital signal and may output the digital signal. For example, the analog-to-digital converter 130 may sample the reset level signal and the image level signal in a correlated double sampling manner and may then convert the sampled result into a digital signal. To this end, in some embodiments, a correlated double sampler (CDS) may be further included in front of the analog-to-digital converter 130. Double sampling may be performed during some of the readout operations of the small photodiode SPD.

The output buffer 140 may latch and output image data provided from the analog-to-digital converter 130 in units of column. The output buffer 140 may temporarily store image data output from the analog-to-digital converter 130 under control of the timing controller 150 and may then output the latched (or temporarily stored) image data sequentially by a column decoder.

The timing controller 150 may control the pixel array 110, the row decoder/driver 120, the analog-to-digital converter 130, the output buffer 140, and the like. To perform operations of the pixel array 110, the row decoder/driver 120, the analog-to-digital converter 130, the output buffer 140, and the like, the timing controller 150 may supply control signals, such as clock signals and timing control signals. In some embodiments, the timing controller 150 may include a logic control circuit, a phase locked loop (PLL) circuit, a timing control circuit, a communication interface circuit, and the like.

Figure 2:
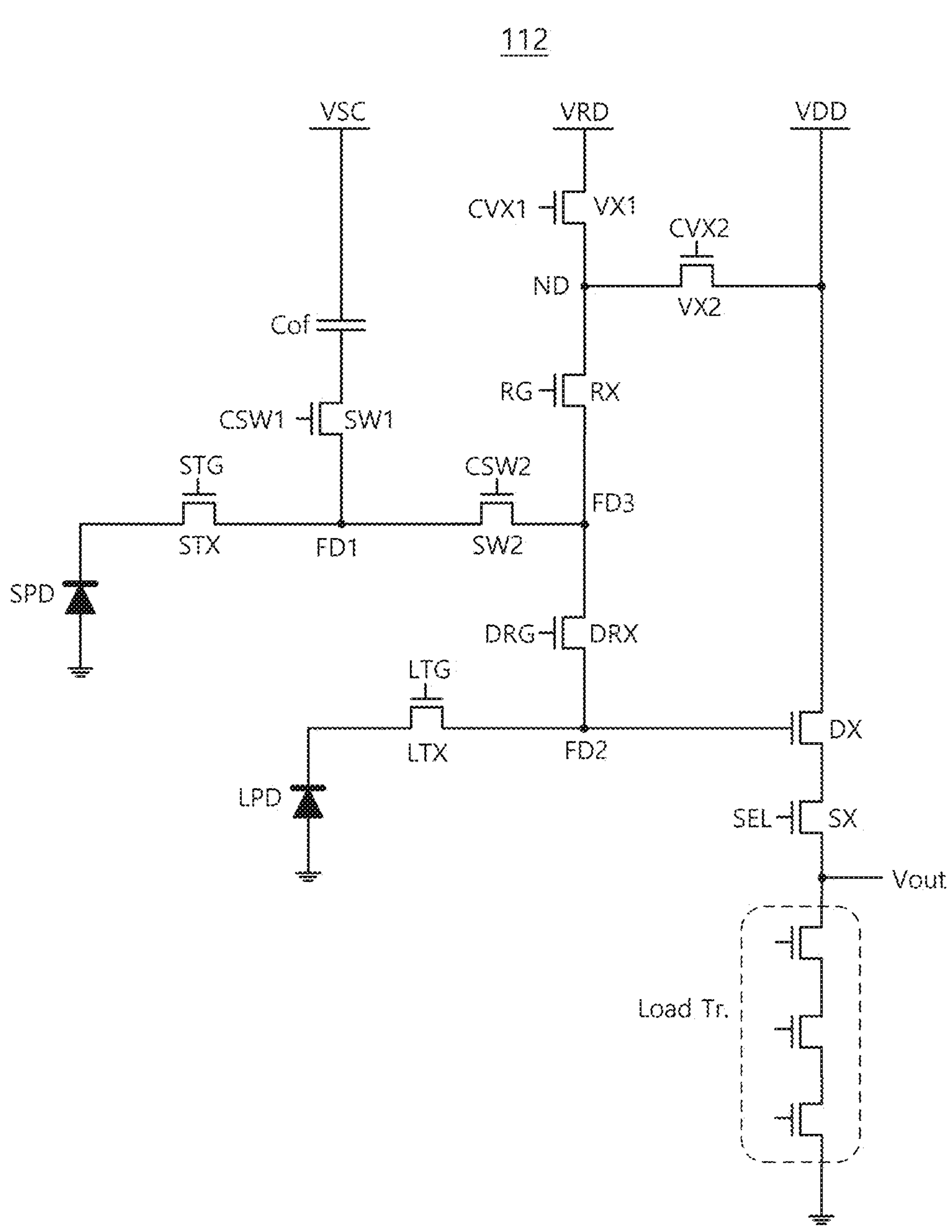
FIG. 2 is a circuit diagram for describing a pixel of an image sensor, according to embodiment.
Figure 3:
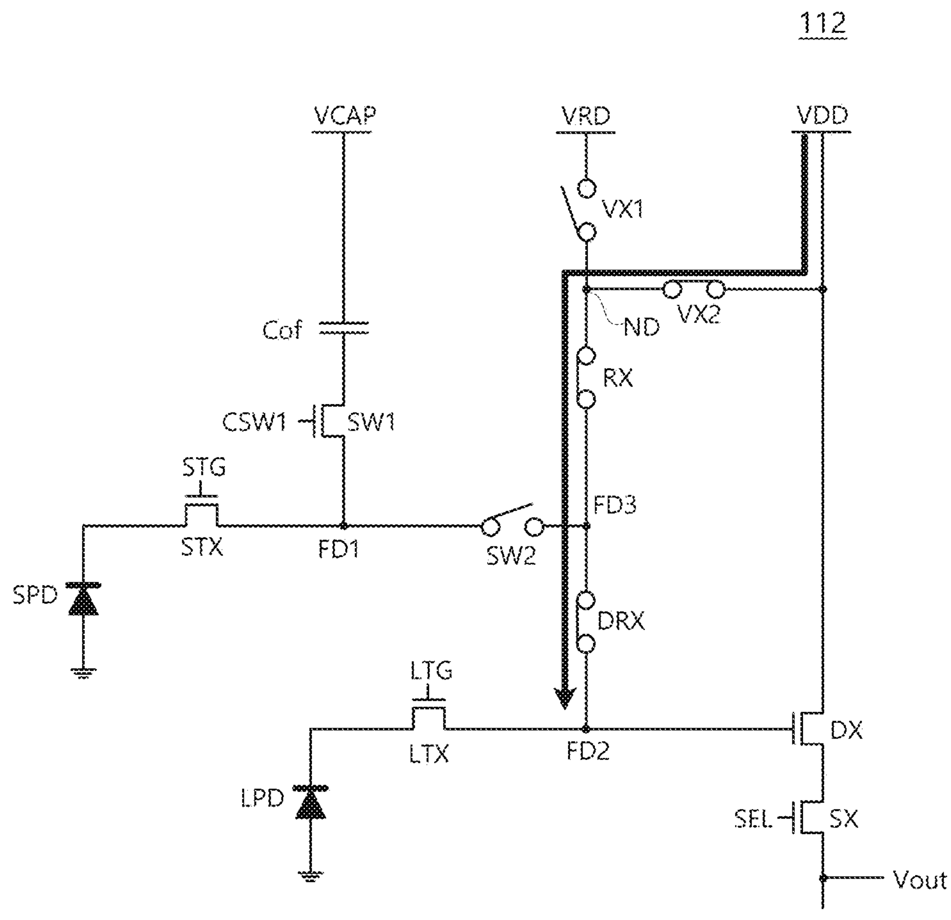
FIG. 3 is a diagram illustrating a reset operation during a readout operation of a large photodiode of the unit pixel of FIG. 2, according to an embodiment.
Figure 4:
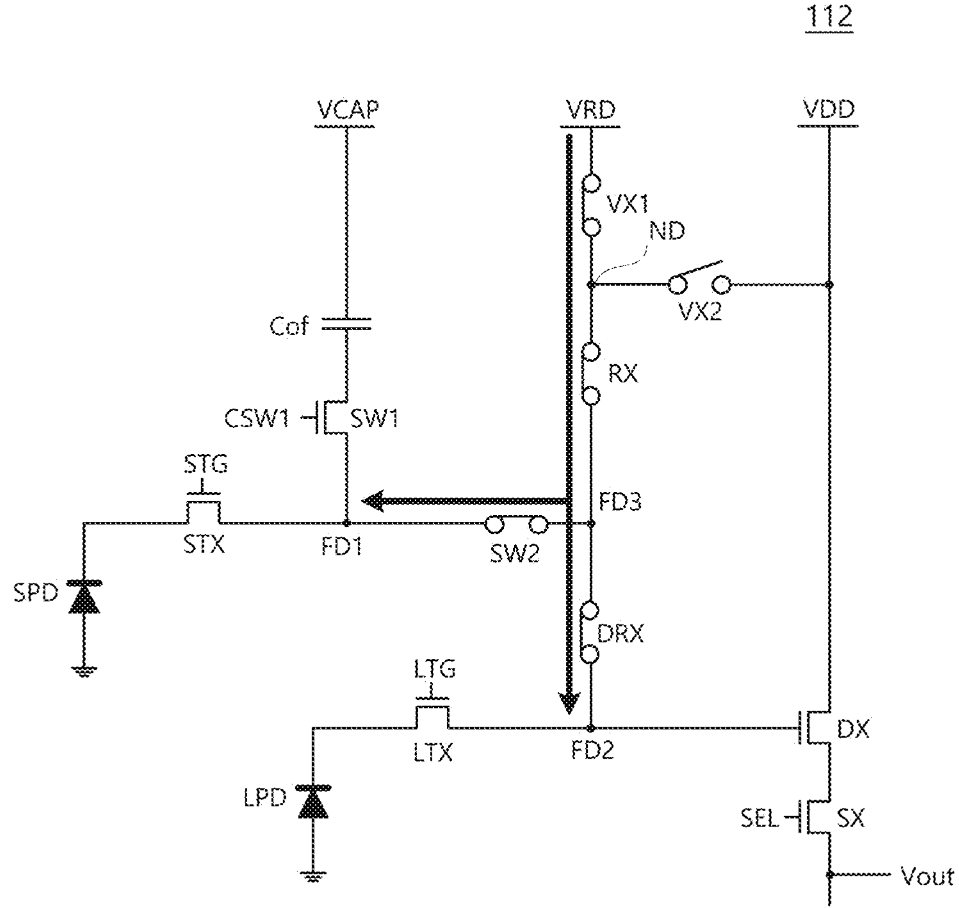
FIG. 4 is a diagram illustrating a reset operation during the readout operation of a small photodiode of the unit pixel of FIG. 2, according to an embodiment.

FIG. 2 is a circuit diagram illustrating the unit pixel 112, according to an embodiment. FIGS. 3 and 4 are diagrams for describing a reset operation among readout operations of each of photodiodes LPD and SPD included in the unit pixel 112 of FIG. 2, according to some embodiments.

The unit pixel 112 according to an embodiment may support a dual conversion gain mode for providing a high conversion gain and a low conversion gain for each photodiode LPD or SPD. In particular, a reset voltage provided during a readout operation of the large photodiode LPD may be different from a reset voltage provided during a readout operation of the small photodiode SPD. The reset voltage provided during the readout to the small photodiode SPD may be lower than the reset voltage provided during the readout to the large photodiode LPD. To this end, a reset node ND connected to a reset transistor RX may be selectively connected to one of a plurality of voltage nodes VRD and VDD based on a readout mode.

Referring to FIG. 2, the unit pixel 112 may include the plurality of photodiodes LPD and SPD, a plurality of transistors LTX, STX, RX, DRX, DX, SX, SW1, SW2, VX1, and VX2, and an overflow capacitor Cof.

The transfer transistors LTX and STX connected to the plurality of photodiodes LPD and SPD are turned on or off in response to transfer control signals LTG and STG provided from the row decoder/driver 120, respectively. The transfer transistors LTX and STX may transmit charges accumulated in the connected photodiodes LPD and SPD to floating diffusion regions FD1 and FD2, respectively.

A plurality of floating diffusion regions FD1, FD2, and FD3 are physically separated from each other. The plurality of floating diffusion regions FD1, FD2, and FD3 may be coupled electrically or separated electrically from each other based on the readout mode.

One end of the overflow capacitor Cof may be connected to the first floating diffusion region FD1 and the other end thereof may be connected to a voltage node VSC. Charges that overflow from the small photodiode SPD may be accumulated in the overflow capacitor Cof through the first floating diffusion region FD1.

The overflow capacitor Cof may be connected to the first floating diffusion region FD1 through the first switch transistor SW1. In response to a first switch control signal CSW1 provided from the row decoder/driver 120, the first switch transistor SW1 is turned on or turned off depending on the conversion gain mode during the readout operation of the small photodiode SPD. For example, the first switch transistor SW1 is turned on in a low conversion gain (LCG) mode of the small photodiode SPD to electrically couple the capacitance of the overflow capacitor Cof to the second floating diffusion region FD2 together with the first floating diffusion region FD1 and the third floating diffusion region FD3.

The first floating diffusion region FD1 may be connected to the third floating diffusion region FD3 through the second switch transistor SW2. In response to a second switch control signal CSW2 provided from the row decoder/driver 120, the second switch transistor SW2 is turned on or turned off depending on the conversion gain mode during the readout operation of the small photodiode SPD.

The second floating diffusion region FD2 may be connected to the third floating diffusion region FD3 through the gain control transistor DRX, and to the gate of the drive transistor DX, which operates as a source follower amplifier.

The gain control transistor DRX is turned on or off depending on the readout mode of the large photodiode LPD in response to a gain control signal DRG provided from the row decoder/driver 120. For example, the gain control transistor DRX is turned on in a low conversion gain (LCG) mode of the large photodiode LPD to electrically couple the third floating diffusion region FD3 to the second floating diffusion region FD2. The gain control transistor DRX is turned off in a high conversion gain (HCG) mode of the large photodiode LPD to electrically separate the third floating diffusion region FD3 from the second floating diffusion region FD2.

A gate of the drive transistor DX may be connected to the second floating diffusion region FD2, and may serve as a source follower amplifier. For example, in some embodiments, the drive transistor DX may convert the potential of the second floating diffusion region FD2 into a voltage and may output (Vout) thee voltage to a column line CLi via the select transistor SX. In some embodiments, the drive transistor DX may convert the potential of the second floating diffusion region FD2, to which the first and/or third floating diffusion region FD1 or FD3 is electrically coupled, into a voltage based on the readout mode, and may output (Vout) the voltage to a column line via the select transistor SX.

The select transistor SX is turned on when the unit pixel to be read in units of row is selected. The select transistor SX may be driven by a select signal SEL provided in units of row from the row decoder/driver 120. When the select transistor SX is turned on, a voltage amplified through the drive transistor DX may be delivered to the drain of the select transistor SX. The select transistor SX may output (Vout) the received voltage to the column line CLi.

The reset transistor RX of the unit pixel 112 according to an embodiment may reset at least one of the first, second, and third floating diffusion regions FD1, FD2, and FD3 in response to a reset signal RG. For example, as illustrated in FIG. 2, a source of the reset transistor RX may be connected to the third floating diffusion region FD3. When the reset signal RG is activated while the gain control signal DRG is activated, the gain control transistor DRX is turned on, and the reset voltage is delivered from the reset node ND to the second and third floating diffusion regions FD2 and FD3. When the reset signal RG is activated while the second switch control signal CSW2 is activated, the second switch transistor SW2 is turned on, and the reset voltage is delivered from the reset node ND to the first and third floating diffusion regions FD1 and FD3. Depending on the readout mode, the gain control transistor DRX and the second switch transistor SW2 may be turned on or off at the same time, or one or the other of the gain control transistor DRX or the second switch transistor SW2 may be turned on.

The reset transistor RX is selectively connected to one of the plurality of voltage nodes VRD and VDD through the reset node ND. For example, the reset transistor RX may be selectively connected to one of the voltage nodes VRD and VDD through the reset node ND based on the readout mode. In an embodiment, the voltage nodes VRD and VDD may provide different reset voltages. In an embodiment, the voltage provided by the first voltage node VRD may be lower than the voltage provided by the second voltage node VDD. The reset node ND may be connected to the plurality of voltage nodes VRD and VDD through the first voltage select transistor VX1 or the second voltage select transistor VX2, respectively. The first voltage select transistor VX1 and the second voltage select transistor VX2 are turned on or turned off in response to voltage select signals CVX1 and CVX2 provided from the row decoder/driver 120, respectively. The first voltage select transistor VX1 and the second voltage select transistor VX2 are turned on in different readout sections.

In an embodiment, referring to FIG. 3, during a readout operation of the large photodiode LPD, the second voltage select transistor VX2 is turned on, and the second switch transistor SW2 and the first voltage select transistor VX1 are turned off or maintained in an off state. In this case, the voltage of the second and third floating diffusion regions FD2 and FD3 may be reset to the voltage level provided by the second voltage node VDD.

In detail, during the readout operation of the large photodiode LPD, a reset level signal is sampled from at least one floating diffusion region in each of the HCG mode and the LCG mode. The reset level signal is sampled from at least one floating diffusion region reset to a voltage level provided by the second voltage node VDD. To this end, the second voltage select transistor VX2, which connects the reset node ND and the second voltage node VDD, is turned on. Furthermore, the reset transistor RX, which connects the reset node ND and the third floating diffusion region FD3, and the gain control transistor DRX, which connects the third floating diffusion region FD3 and the second floating diffusion region FD2, are turned on. The second switch transistor SW2 and the first voltage select transistor VX1 are turned off or maintained in an off state. While the third floating diffusion region FD3 is electrically coupled to the second floating diffusion region FD2, a reset voltage from the second voltage node VDD is provided to the third floating diffusion region FD3 and the second floating diffusion region FD2.

In an embodiment, referring to FIG. 4, in at least part of sections during the readout period of the small photodiode SPD, the first voltage select transistor VX1 is turned on, the second switch transistor SW2 is turned on, and the second voltage select transistor VX2 is turned off or maintained in the off state. In this case, on the basis of the conversion gain mode during the readout period of the small photodiode SPD, the voltage of each of the first, second and third floating diffusion regions FD1, FD2, and FD3, which are electrically coupled to each other, may be reset to a voltage level provided by the first voltage node VRD. In some embodiments, the voltage of the overflow capacitor Cof and the first, second and third floating diffusion regions FD1, FD2, and FD3, which are electrically coupled to each other, may be reset to the voltage level provided by the first voltage node VRD.

In detail, during the readout operation of the large photodiode LPD, a reset level signal is sampled from at least one floating diffusion region in each of the HCG mode and LCG mode. The reset level signal is sampled from at least one floating diffusion region reset to the voltage level provided by the first voltage node VRD. To this end, the first voltage select transistor VX1, which connects the reset node ND and the first voltage node VRD, is turned on, and the second voltage select transistor VX2 is turned off or maintained in the off state. The reset transistor RX connecting the reset node ND and the third floating diffusion region FD3, the second switch transistor SW2 connecting the third floating diffusion region FD3 and the first floating diffusion region FD1, and the gain control transistor DRX connecting the third floating diffusion region FD3 and the second floating diffusion region FD2 are turned on. With the first floating diffusion region FD1 and the third floating diffusion region FD3 electrically coupled to the second floating diffusion region FD2, a reset voltage from the first voltage node VRD is provided to the third floating diffusion region FD3, the first floating diffusion region FD1, and the second floating diffusion region FD2. During the readout operation of the small photodiode SPD, the first switch transistor SW1 connecting the overflow capacitor Cof and the first floating diffusion region FD1 may be turned on in the LCG mode. In this case, a reset voltage from the first voltage node VRD may also be provided to the overflow capacitor Cof.

In other words, at least one floating diffusion region of the unit pixel 112 according to an embodiment is reset to a voltage level that is different during the readout operation of the large photodiode LPD and the readout operation of the small photodiode SPD. That is, in some embodiments, at least one floating diffusion region of the unit pixel 112 is reset during the readout operation of the large photodiode LPD to a voltage level that is different from a voltage level to which the at least one floating diffusion region of the unit pixel 112 is reset during the readout operation of the small photodiode SPD.

In particular, in some embodiments, a reset voltage provided from the first voltage node VRD through the reset node ND during the readout operation of the small photodiode SPD may be lower than a reset voltage provided from the second voltage node VDD during the readout operation of the large photodiode LPD. Accordingly, kTC noise due to the power supply voltage VDD during the readout operation of the small photodiode SPD may be reduced. Moreover, normal operations of load transistors (Load Tr.) through which a constant current flows for an operation as a source follower amplifier of the drive transistor DX may be guaranteed.

Figure 5:
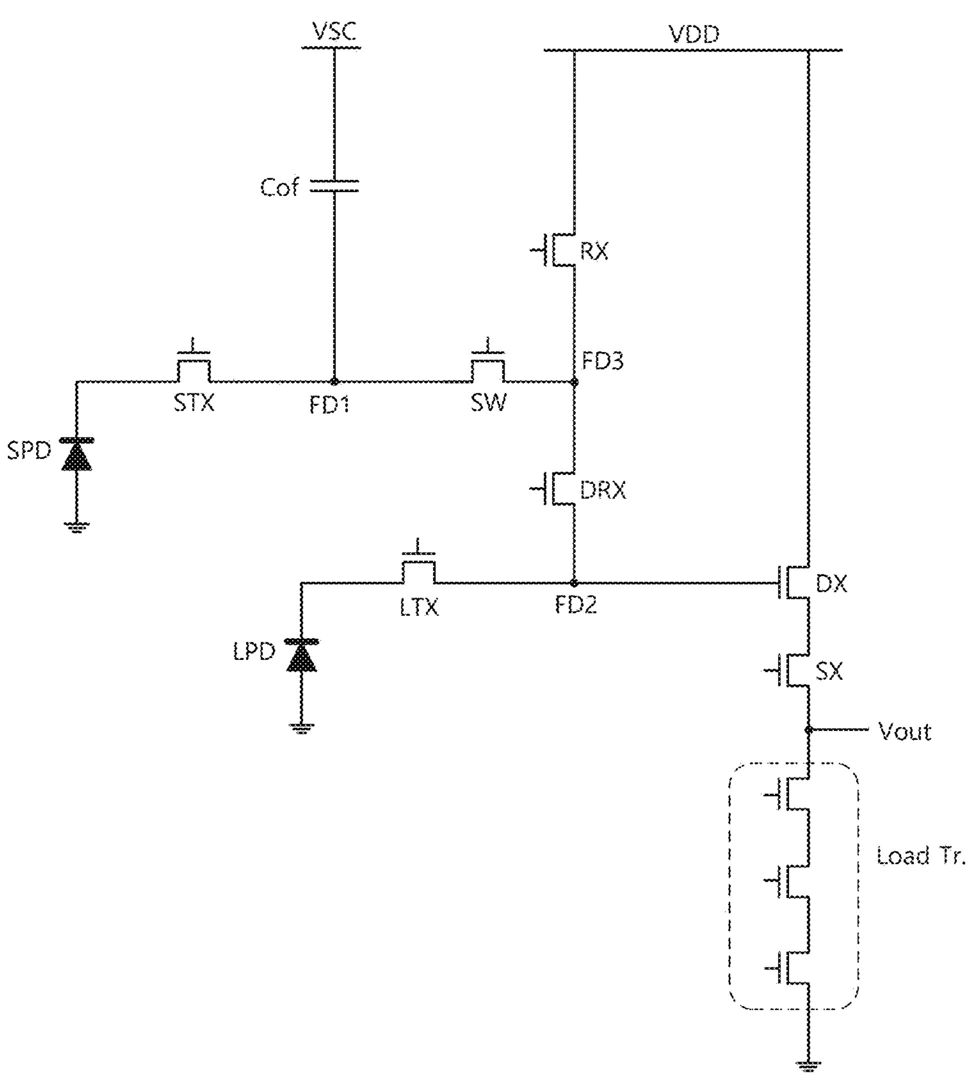
FIG. 5 is a circuit diagram for describing a unit pixel of a related art image sensor.

FIG. 5 is a circuit diagram for describing a unit pixel of a related art image sensor. For example, referring to FIG. 5, in a related art split photodiode pixel, the reset transistor RX is connected to one power supply voltage node VDD. Accordingly, the reset voltage of the power supply voltage node VDD is provided to the floating diffusion regions FD1, FD2, and FD3.

During the sampling operation of the reset level signal, the related art split photodiode pixel is turned off the reset transistor RX after the reset voltage is provided.

In a HCG mode of the large photodiode LPD of the related art split photodiode pixel, the gain control transistor DRX connecting the second floating diffusion region FD2 and the third floating diffusion region FD3 is turned off. In this case, due to clock-feedthrough while the gain control transistor DRX and the reset transistor RX are turned off, the voltage of the second floating diffusion region FD2 drops.

On the other hand, during the readout operation of the small photodiode SPD of the related art split photodiode pixel, the gain control transistor DRX connecting the second floating diffusion region FD2 and the third floating diffusion region FD3 is turned on. Also, a switch transistor SW connecting the third floating diffusion region FD3 and the first floating diffusion region FD1 is turned on. In this case, when the switch transistor SW is turned on, the voltage of the first floating diffusion region FD1 increases due to clock-feedthrough.

That is, in a related art split photodiode pixel, a difference between a reset level signal of a specific conversion gain mode of the large photodiode LPD and a reset level signal of a specific conversion gain mode of the small photodiode SPD may be very large. Moreover, a voltage conversion ratio of the source follower transistor SX also has a predetermined variation. For the function of the source follower transistor SX, load transistors (Load Tr.) need to operate in a saturation area. However, due to the large difference in the reset level signal, the load transistors (Load Tr.) may operate in a triode area. Accordingly, there is a possibility that a pixel fails to operate normally.

By contrast, in the unit pixel 112 according to an embodiment, a reset voltage provided during the readout operation of the small photodiode SPD is lower than a reset voltage provided during the readout operation of the large photodiode LPD. In other words, at least one floating diffusion region is reset to a voltage level that is different during the readout period of the small photodiode SPD than during the readout period of the large photodiode LPD. Accordingly, despite the clock-feedthrough, the difference between a reset level signal of a specific conversion gain mode of the large photodiode LPD and a reset level signal of a specific conversion gain mode of the small photodiode SPD is not large, or levels of the two signals may be similar to each other. As a result, the load transistors (Load Tr.) may operate in the saturation area, and pixels may operate normally.

In an embodiment, when the reset voltage provided during the readout operation of the small photodiode SPD is provided by an internal regulator of the image sensor, kTC noise caused by the power supply voltage VDD may be reduced. This reduction in kTC noise is more advantageous than in related art split photodiode pixels when it is impossible to perform correlated double sampling (e.g., in an LCG mode for sampling charges on the overflow capacitor of the small photodiode SPD).

Figure 6:
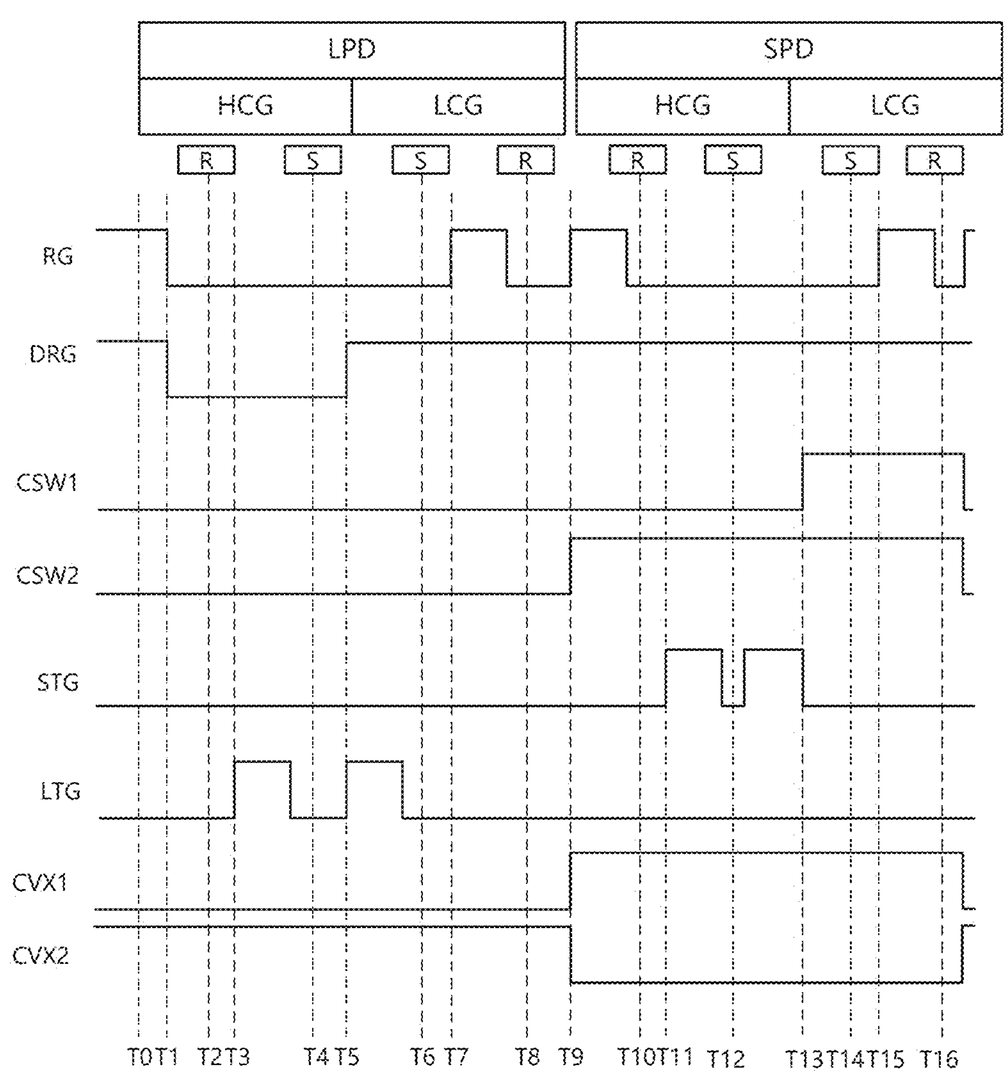
FIG. 6 is a timing diagram illustrating a driving method of a readout period of the unit pixel of FIG. 2, according to an embodiment.

FIG. 6 is a timing diagram illustrating a driving method during the readout period of the unit pixel of FIG. 2, according to an embodiment. FIGS. 7A to 7H are diagrams illustrating changes in potential of each photodiode of the unit pixel of FIG. 2, according to some embodiments.

Referring to FIG. 6, at time T0, the reset signal RG and the gain control signal DRG provided to the unit pixel 112 are at high levels. Furthermore, the first voltage select signal CVX1 is low level, and the second voltage select signal CVX2 is high level. Accordingly, the reset voltage of the second voltage node VDD is provided to the reset node ND. The reset transistor RX is turned on, and the reset node ND is electrically connected to the third floating diffusion region FD3 and the second floating diffusion region FD2. The charge of the third floating diffusion region FD3 and the second floating diffusion region FD2 is drained to the second voltage node VDD through the reset node ND. As a result, the second floating diffusion region FD2 and the third floating diffusion region FD3 are reset to a reset voltage level provided by the second voltage node VDD.

At time T1, the reset signal RG and the gain control signal DRG transition to low levels. Accordingly, the reset transistor RX and the gain control transistor DRX are turned off. As a result, the third floating diffusion region FD3 is electrically blocked from the second floating diffusion region FD2, and each of the second floating diffusion region FD2 and the third floating diffusion region FD3 is in a floating state.

Figure 7A:
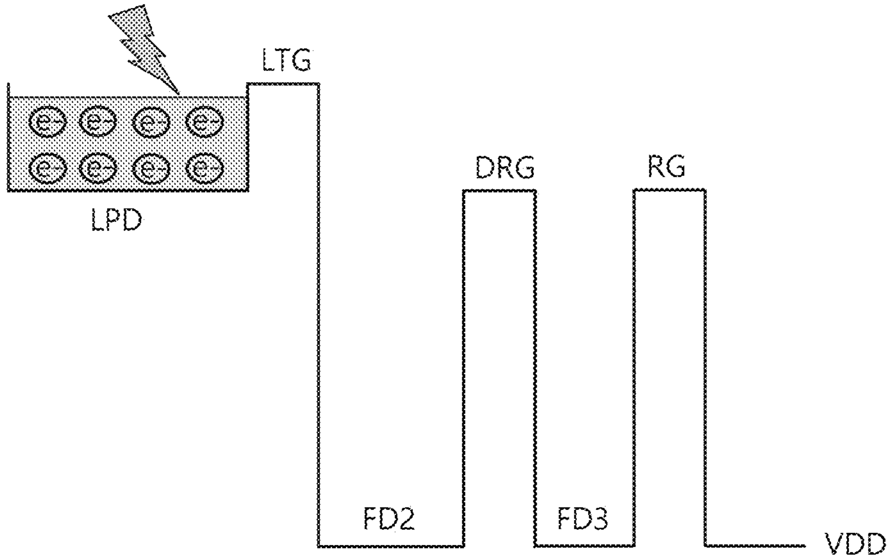
FIGS. 7A to 7H are diagrams illustrating changes in potential of each photodiode of the unit pixel of FIG. 2, according to some embodiments.

At time T2, the drive transistor DX samples a voltage level of the second floating diffusion region FD2 and may output (Vout) the sampled result as a reset level signal of the HCG mode of the large photodiode LPD. As shown in FIG. 7A, the second floating diffusion region FD2 is blocked from the third floating diffusion region FD3 by the potential barrier of the gain control transistor DRX. The voltage level of the second floating diffusion region FD2 may be defined as a first reference voltage ($1^{st}$ reference voltage), and may be used as a reference voltage for the HCG mode of the large photodiode LPD.

At time T3, the transfer control signal LTG transitions to a high level. Accordingly, the transfer transistor LTX connected to the large photodiode LPD is turned on, and charges accumulated in the large photodiode LPD moves to the second floating diffusion region FD2.

Figure 7B:
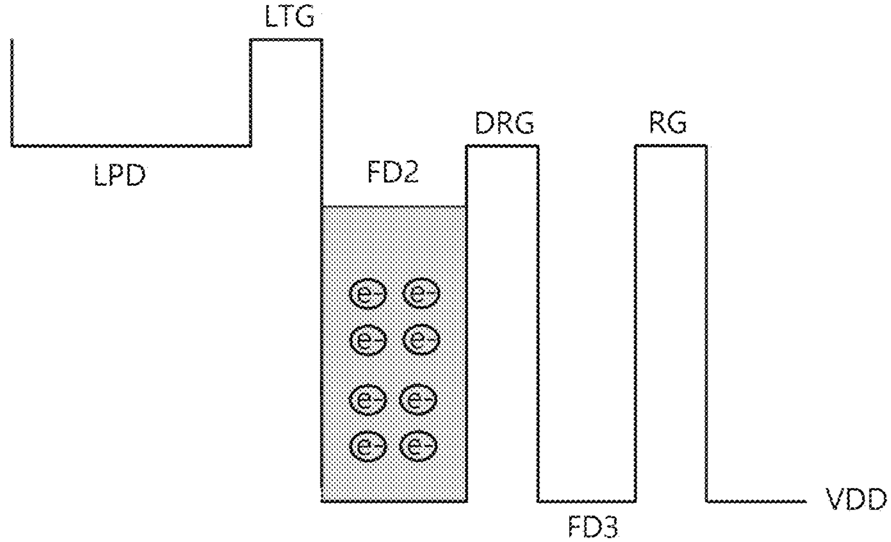

At time T4, the transfer control signal LTG is at a low level. The drive transistor DX samples a voltage level of the second floating diffusion region FD2 and may output (Vout) the sampled result as an image level signal of the HCG mode of the large photodiode LPD. As shown in FIG. 7B, the second floating diffusion region FD2 is blocked from the third floating diffusion region FD3 by the potential barrier of the gain control transistor DRX. Accordingly, the image level signal having a HCG mode may be output. The correlated double sampling (CDS) may be performed on the image level signal of the HCG mode of the large photodiode LPD based on the first reference voltage.

At time T5, the gain control signal DRG transitions to a high level. Accordingly, the gain control transistor DRX is turned on. As a result, the third floating diffusion region FD3 is electrically coupled to the second floating diffusion region FD2, and charges of the second floating diffusion region FD2 are shared with the third floating diffusion region FD3. In some embodiments, the transfer control signal LTG may be transitioned to a high level once again such that charges remaining in the large photodiode LPD move to the second floating diffusion region FD2.

Figure 7C:
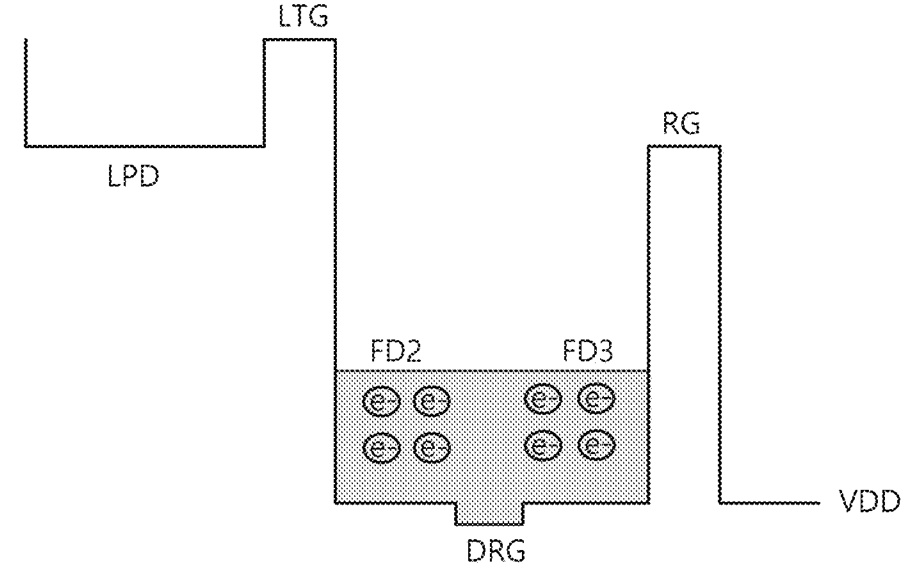

At time T6, the transfer control signal LTG is at a low level. The drive transistor DX samples a voltage level of the second floating diffusion region FD2 electrically coupled with the third floating diffusion region FD3 and outputs (Vout) the sampled result as an image level signal of the LCG mode of the large photodiode LPD. As shown in FIG. 7C, a potential barrier of the gain control transistor DRX disappears and the second floating diffusion region FD2 shares charge with the third floating diffusion region FD3. Accordingly, the image level signal in an LCG mode may be output.

At time T7, the reset signal RG transitions to a high level. The gain control signal DRG is at a high level. Moreover, the second voltage select signal CVX2 is also at a high level. Accordingly, a reset voltage of the second voltage node VDD is provided to the third floating diffusion region FD3 and the second floating diffusion region FD2 through the reset node ND. The second floating diffusion region FD2 and the third floating diffusion region FD3 are reset to a reset voltage level provided by the second voltage node VDD.

Figure 7D:
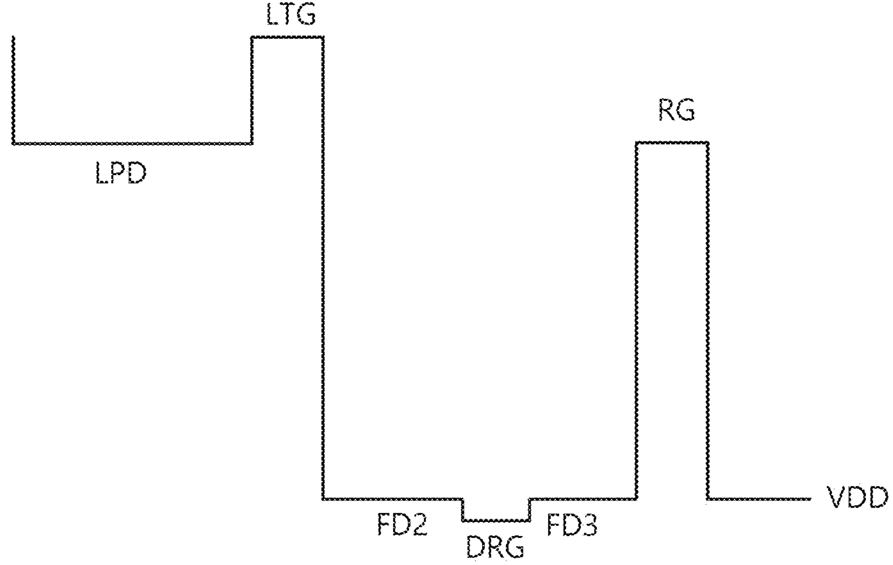

At time T8, the drive transistor DX samples the voltage level of the second floating diffusion region FD2 electrically coupled to the third floating diffusion region FD3 and outputs (Vout) the sampled result as a reset level signal of the LCG mode of the large photodiode LPD. As shown in FIG. 7D, a potential barrier of the gain control transistor DRX disappears and the second floating diffusion region FD2 is electrically coupled to the third floating diffusion region FD3. The voltage level of the second floating diffusion region FD2 electrically coupled to the third floating diffusion region FD3 may be defined as a second reference voltage ($2^{nd}$ reference voltage), and may be used as the reference voltage of the LCG mode of the large photodiode LPD.

In FIG. 6, the second voltage select signal CVX2 is shown to maintain a high level during the readout operation of the large photodiode LPD. However, in some embodiments, the second voltage select signal CVX2 may selectively maintain a high level during only the same section as the reset signal RG. For example, the second voltage select signal CVX2 may be transition to a high level along with the reset signal RG.

At time T9, the reset signal RG, the second switch control signal CSW2, and the first voltage select signal CVX1 transition to high levels. The second voltage select signal CVX2 transitions to a low level. The gain control signal DRG is at a high level. Accordingly, the first voltage select transistor VX1 is turned on, and the reset voltage of the first voltage node VRD is provided to the reset node ND. The reset transistor RX is turned on, and the reset node ND is electrically connected to the first floating diffusion region FD1, the second floating diffusion region FD2, and the third floating diffusion region FD3. Charges of the first floating diffusion region FD1, the second floating diffusion region FD2, and the third floating diffusion region FD3 are drained to the first voltage node VRD through the reset node ND. As a result, the first floating diffusion region FD1, the second floating diffusion region FD2, and the third floating diffusion region FD3 are reset to a reset voltage level provided by the first voltage node VRD. The first voltage node VRD may receive a voltage from a regulator inside the image sensor.

Figure 7E:
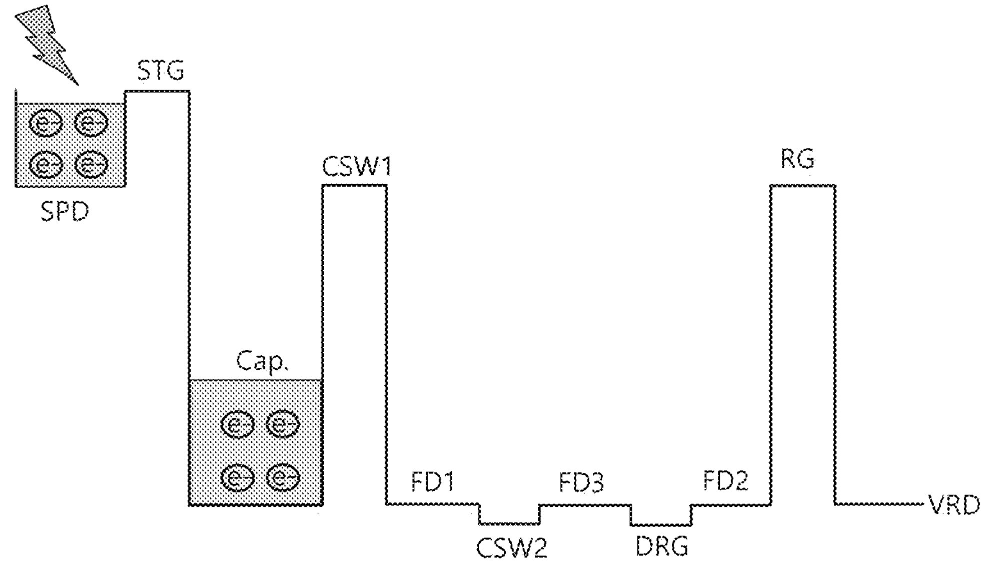

At time T10, the drive transistor DX samples the voltage level of the second floating diffusion region FD2, which is electrically coupled to the first floating diffusion region FD1 and the third floating diffusion region FD3, and outputs (Vout) the sampled result as a reset level signal in the HCG mode of the small photodiode SPD. As shown in FIG. 7E, the overflow capacitor Cof is blocked from the first floating diffusion region FD1 by the potential barrier of the first switch transistor SW1. Accordingly, charges that overflow from the small photodiode SPD to the overflow capacitor Cof do not move to the first floating diffusion region FD1. A voltage level of the second floating diffusion region FD2 electrically coupled to the first floating diffusion region FD1 and the third floating diffusion region FD3 may be defined as a third reference voltage (3rd reference voltage), and may be used as a reference voltage for the HCG mode of the small photodiode SPD.

At time T11, the transfer control signal STG transitions to a high level. Accordingly, the transfer transistor STX connected to the small photodiode SPD is turned on, and charges accumulated in the small photodiode SPD move to the first floating diffusion region FD1. The charges moved to the first floating diffusion region FD1 are shared with the second floating diffusion region FD2 and the third floating diffusion region FD3.

Figure 7F:
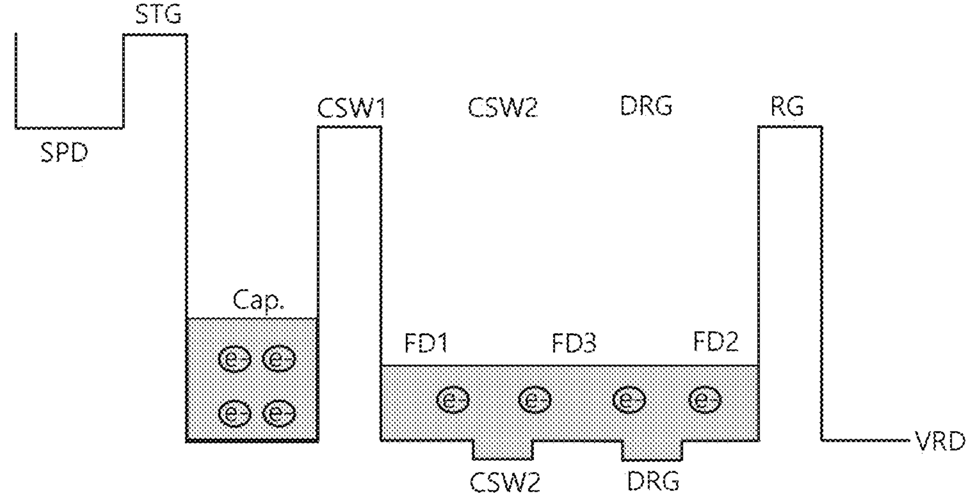

At time T12, the transfer control signal STG is at a low level. The drive transistor DX samples the voltage level of the second floating diffusion region FD2, which is electrically coupled to the first floating diffusion region FD1 and the third floating diffusion region FD3, and outputs (Vout) the sampled result as an image level signal in the HCG mode of the small photodiode SPD. As shown in FIG. 7F, the overflow capacitor Cof is blocked from the first floating diffusion region FD1 by the potential barrier of the first switch transistor SW1. Accordingly, the image level signal having a HCG mode may be output.

At time point T13, the first transmission signal CSW1 transitions to a high level. Accordingly, the first switch transistor SW1 is turned on. As a result, the overflow capacitor Cof is electrically coupled to the first floating diffusion region FD1, and charges of the overflow capacitor Cof are shared with the first floating diffusion region FD1, the second floating diffusion region FD2, and the third floating diffusion region FD3. In some embodiments, before time T13, the transfer control signal STG is transitioned to a high level once again such that charges remaining in the small photodiode SPD move to the first floating diffusion region FD1.

Figure 7G:
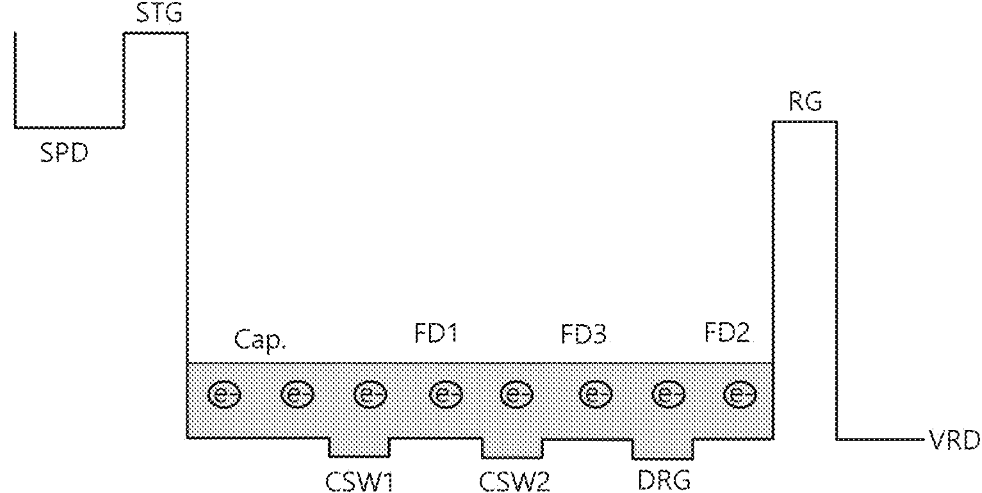

At time T14, the drive transistor DX samples the voltage level of the second floating diffusion region FD2, which is electrically coupled to the overflow capacitor Cof, the first floating diffusion region FD1, and the third floating diffusion region FD3, and outputs (Vout) the sampled result as an image level signal in the LCG mode of the small photodiode SPD. As shown in FIG. 7G, charges of the overflow capacitor Cof are shared with the first floating diffusion region FD1, the second floating diffusion region FD2, and the third floating diffusion region FD3. Accordingly, the image level signal of the LCG mode of the small photodiode SPD may be output.

At time T15, the reset signal RG transitions to a high level. The gain control signal DRG, the first switch control signal CSW1, the second switch control signal CSW2, and the first voltage select signal CVX1 are high levels. Accordingly, the overflow capacitor Cof, the first floating diffusion region FD1, the second floating diffusion region FD2, and the third floating diffusion region FD3 are reset to reset voltage levels provided by the first voltage node VRD.

Figure 7H:
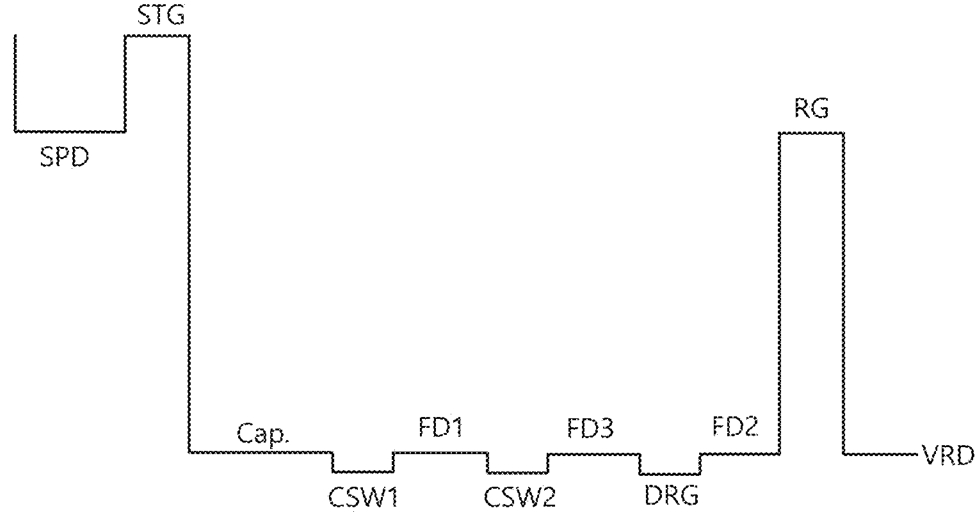

At time T16, the drive transistor DX samples the voltage level of the second floating diffusion region FD2, which is electrically coupled to the overflow capacitor Cof, the first floating diffusion region FD1, and the third floating diffusion region FD3, and outputs (Vout) the sampled result as a reset level signal in the LCG mode of the small photodiode SPD. As shown in FIG. 7H, the potential barriers of the first switch transistor SW1, the second switch transistor SW2, and the gain control transistor DRX disappear, and the overflow capacitor Cof, the first floating diffusion region FD1, and the third floating diffusion region FD3 are coupled to the second floating diffusion region FD2. A voltage level of the second floating diffusion region FD2 electrically coupled to the overflow capacitor Cof, the first floating diffusion region FD1, and the third floating diffusion region FD3 may be defined as a fourth reference voltage (4st reference voltage), and may be used as a reference voltage for the LCG mode of the small photodiode SPD.

In FIG. 6, the first voltage select signal CVX1 is shown to maintain a high level during the readout operation of the small photodiode SPD. However, the first voltage select signal CVX1 may selectively maintain a high level during only the same section as the reset signal RG. For example, the first voltage select signal CVX1 may be transition to a high level along with the reset signal RG.

As described with reference to FIGS. 6 and 7A-7H, a reset voltage of the first voltage node VRD, which is lower than a reset voltage provided by the second voltage node VDD, is supplied to at least one floating diffusion region during the readout operation of the small photodiode SPD through the first voltage select transistor VX1.

Figure 8:
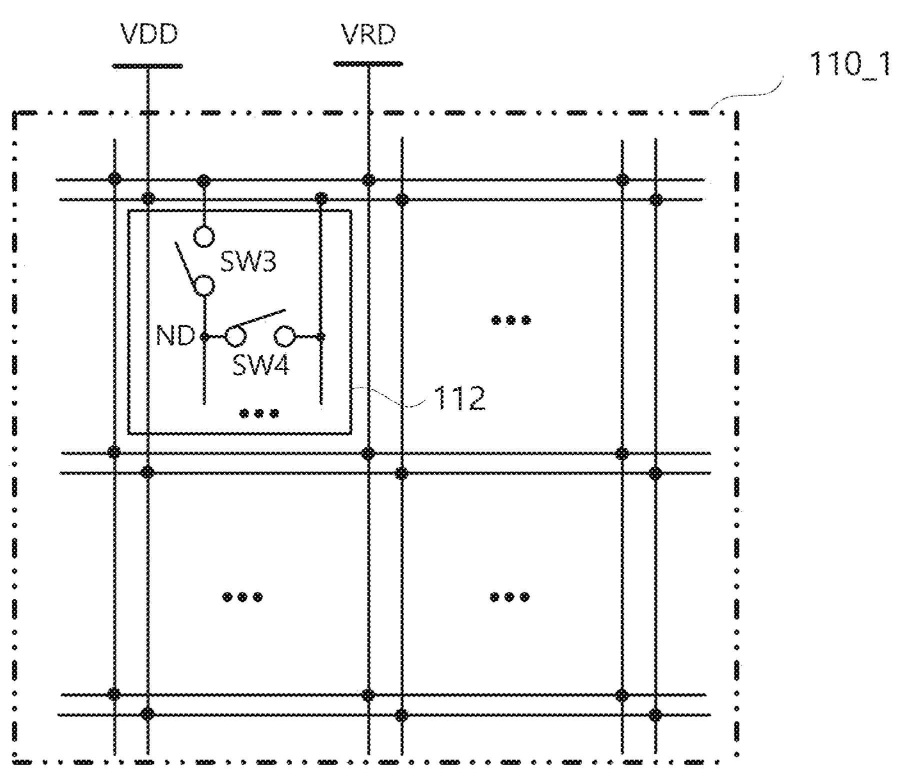
FIG. 8 is a circuit diagram showing an example of a voltage node arrangement, according to an embodiment.

FIG. 8 is a circuit diagram illustrating an example of a layout of a plurality of voltage nodes disposed in a pixel array 110_1 of an image sensor, according to an embodiment.

The plurality of voltage nodes VRD and VDD may correspond to the first voltage node VRD and the second voltage node VDD of the unit pixel 112 described in FIG. 2. Detailed descriptions of parts that are identical or similar to the above-described parts are omitted for conciseness.

The first voltage node VRD, which is one of the plurality of voltage nodes VRD and VDD disposed in the pixel array 110_1 according to an embodiment, may provide a lower voltage to the unit pixel 112 than the second voltage node VDD, which is the other thereof. The voltages of the first voltage node VRD and the second voltage node VDD may be provided to the at least one floating diffusion region of the unit pixel 112 through the reset node ND of the unit pixel 112. The first voltage node VRD and the second voltage node VDD may be connected to the reset node ND through a third switch transistor SW3 and a fourth switch transistor SW4, respectively. The voltage of the first voltage node VRD may be provided as a reset voltage during the readout operation of the small photodiode SPD of the unit pixel 112. The voltage of the second voltage node VDD may be provided as a reset voltage during the readout operation of the large photodiode LPD of the unit pixel 112. Accordingly, the third switch transistor SW3 and the fourth switch transistor SW4 are turned on during different time periods.

In some embodiments, the first voltage node VRD of the image sensor may have a mesh structure. Accordingly, even in the case of pixels of an image sensor operating in a rolling shutter manner, the reset voltage of the first voltage node VRD may be accurately provided for each row of a pixel array during the readout operation of the small photodiode SPD.

The first voltage node VRD in the mesh structure may reduce blinking horizontal fixed pattern noise (HFPN) of the image sensor.

Returning to FIG. 5, a related art split photodiode pixel may be instantaneously filled with charges on the overflow capacitor Cof by incident light of very high intensity. In this case, a very large overflow current from the voltage node VDD may flow into the small photodiode SPD during the reset operation of the small photodiode SPD. Accordingly, due to a voltage drop in the floating diffusion region caused by the overflow current, reset level signals of pixels in some rows are significantly different from reset level signals of pixels in other rows, and thus blink HFPN occurs.

By contrast, the first voltage node VRD according to an embodiment may reduce a voltage drop in a floating diffusion region despite the overflow current, by lowering the resistance of a reset path through the mesh structure. As a result, the blink HFPN may be prevented.

Figure 9:
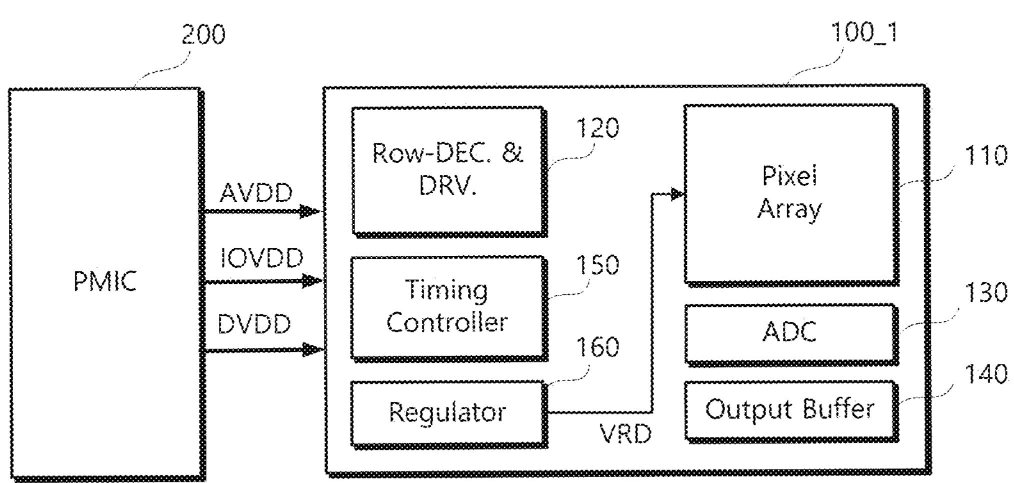
FIG. 9 is a block diagram illustrating an image sensor, according to an embodiment.

FIG. 9 is a circuit diagram illustrating an example of an image sensor 100_1, according to an embodiment.

The image sensor 100_1 includes the pixel array 110 including a plurality of unit pixels, the row decoder/driver (Row-DEC. & DRV.) 120, the analog-to-digital converter (ADC) 130, the output buffer 140, and the timing controller 150. In some embodiments, the image sensor 100_1 may further include a regulator 160. Each pixel in the pixel array 110 is a split photodiode pixel including a large photodiode LPD and a small photodiode SPD, which have receiving areas of different sizes from each other. The pixel includes an overflow capacitor that stores charges that overflow from the small photodiode SPD. Each of the large photodiode LPD and the small photodiode SPD has a HCG mode and an LCG mode. Detailed descriptions of parts that are identical or similar to the above-described parts are omitted for conciseness.

During a readout operation of each of the large photodiode LPD and the small photodiode SPD according to an embodiment, voltages having different levels may be provided as reset voltages.

The voltage of the first voltage node VRD may be received from the regulator 160 inside the image sensor. The regulator 160 receive an analog power supply AVDD from a power management integrated circuit (PMIC) 200 positioned outside the image sensor, may regulate the analog power supply AVDD, and may provide the analog power supply AVDD that is regulated to the first voltage node VRD. The voltage of the second voltage node VDD may be received from the PMIC 200. That is, the voltage of the second voltage node VDD may be provided by the AVDD from the PMIC 200 without regulation by the regulator 160.

The PMIC 200 may provide the analog power supply AVDD, a digital power supply DVDD, and an IO power supply IOVDD to the image sensor 100_1. The second voltage node VDD may be connected to the analog power supply AVDD provided by the PMIC 200. That is, the second voltage node VDD may be connected to the analog power supply AVDD provided by the PMIC 200 without being regulated by the regulator 160.

During the readout operation of the small photodiode SPD, the voltage of the first voltage node VRD may be provided as a reset voltage of a pixel circuit. During the readout operation of the large photodiode LPD, the voltage of the second voltage node VDD may be provided as the reset voltage of the pixel circuit. The voltage of the first voltage node VRD may be lower than the voltage of the second voltage node VDD.

Accordingly, while reading out charges stored in an overflow capacitor according to the conversion gain mode of the small photodiode SPD, the image sensor 100_1 according to an embodiment may reduce kTC noise caused by the power supply voltage AVDD.

In addition, a difference between reset level signals of the small photodiode SPD and the large photodiode LPD due to clock-feedthrough may be reduced. Accordingly, a normal operation of a pixel is guaranteed.

Figure 10:
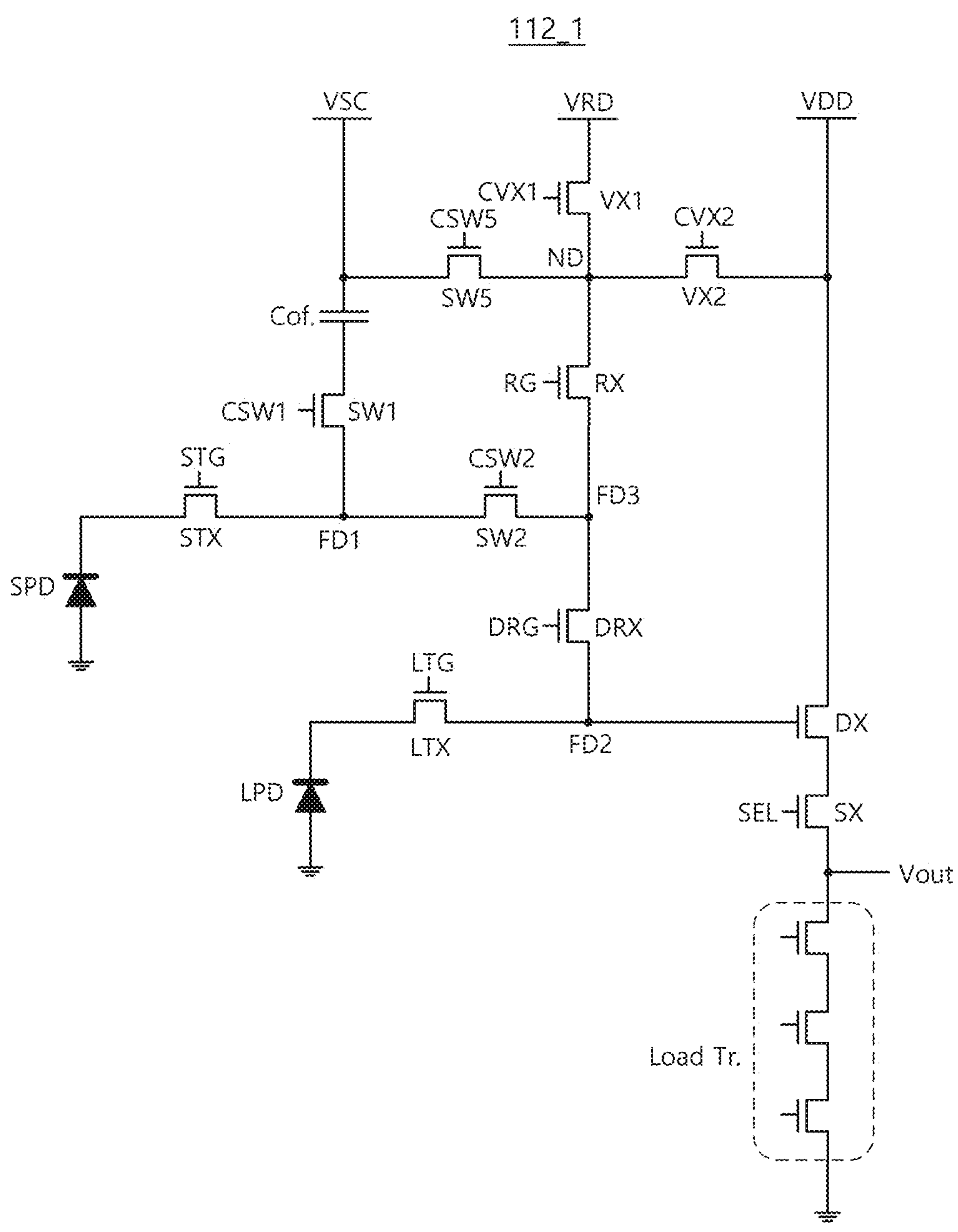
FIG. 10 is a circuit diagram for describing a pixel of an image sensor, according to an embodiment.
Figure 11:
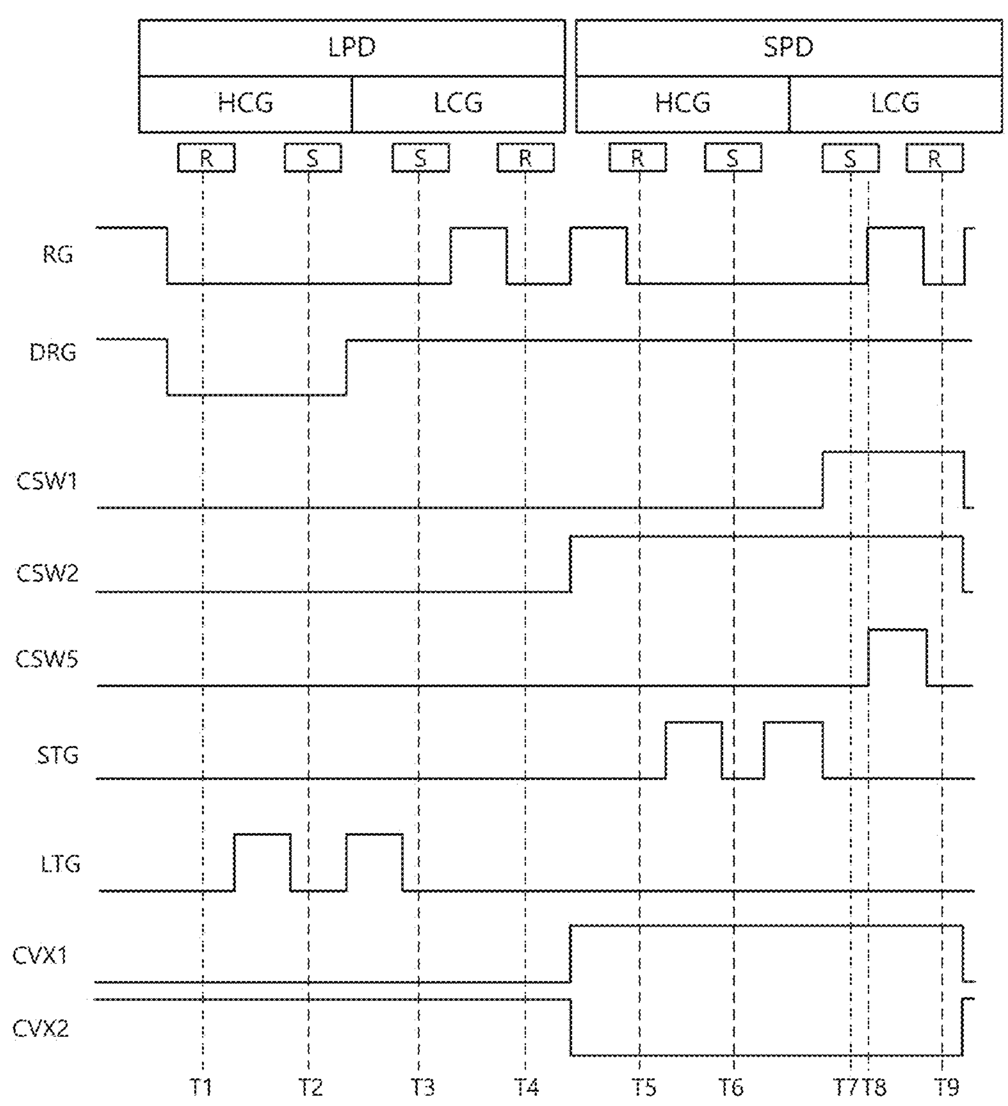
FIG. 11 is a timing diagram illustrating a driving method of the unit pixel of FIG. 10, according to an embodiment.

FIG. 10 is a circuit diagram illustrating an example of a unit pixel 112_1 of an image sensor, according to an embodiment. FIG. 11 is a timing diagram illustrating a driving method during a readout period of the unit pixel 112_1 of FIG. 10, according to an embodiment.

The unit pixel 112_1 according to an embodiment includes the large photodiode LPD and the small photodiode SPD with different sized receiving areas. The unit pixel 112_1 may support a dual conversion gain mode for providing a high conversion gain and a low conversion gain for each photodiode LPD or SPD. A reset voltage provided during a readout operation to the small photodiode SPD may be lower than a reset voltage provided during a readout operation to the large photodiode LPD. To this end, the voltage node ND connected to a reset transistor RX may be selectively connected to one of the plurality of voltage nodes VRD and VDD based on a readout mode.

Referring to FIG. 10, the unit pixel 112_1 may include the plurality of photodiodes LPD and SPD, the plurality of transistors LTX, STX, RX, DRX, DX, SX, SW1, SW2, VX1, and VX2, and the overflow capacitor Cof. Detailed descriptions of parts that are identical or similar to the above-described parts are omitted for conciseness.

Unlike the unit pixel 112 described with reference to FIG. 2, the unit pixel 112_1 according to an embodiment includes a fifth switch transistor SW5 connecting the reset node ND and the overflow capacitor Cof. The fifth switch transistor SW5 is controlled in response to a fifth switch control signal CSW5.

Referring to FIG. 11, at time T1, the drive transistor DX samples a voltage level of the second floating diffusion region FD2 and may output (Vout) the sampled result as a reset level signal of a HCG mode of the large photodiode LPD.

At time T2, the drive transistor DX samples the voltage level of the second floating diffusion region FD2 and may output (Vout) the sampled result as an image level signal of the HCG mode of the large photodiode LPD.

At time T3, the drive transistor DX samples the voltage level of the second floating diffusion region FD2 electrically coupled to the third floating diffusion region FD3 and outputs (Vout) the sampled result as the image level signal of an LCG mode of the large photodiode LPD.

At time T4, the drive transistor DX samples the voltage level of the second floating diffusion region FD2 electrically coupled to the third floating diffusion region FD3 and outputs (Vout) the sampled result as a reset level signal of the LCG mode of the large photodiode LPD.

At time T5, the drive transistor DX samples the voltage level of the second floating diffusion region FD2, which is electrically coupled to the first floating diffusion region FD1 and the third floating diffusion region FD3, and outputs (Vout) the sampled result as a reset level signal in the HCG mode of the small photodiode SPD.

At time T6, the drive transistor DX samples the voltage level of the second floating diffusion region FD2, which is electrically coupled to the first floating diffusion region FD1 and the third floating diffusion region FD3, and outputs (Vout) the sampled result as an image level signal in the HCG mode of the small photodiode SPD.

At time T7, the drive transistor DX samples the voltage level of the second floating diffusion region FD2, which is electrically coupled to the overflow capacitor Cof, the first floating diffusion region FD1, and the third floating diffusion region FD3, and outputs (Vout) the sampled result as an image level signal in the LCG mode of the small photodiode SPD.

At time T8, when the reset signal RG is at a high level, the fifth switch control signal CSW5 transitions to a high level. The first voltage select signal CVX1 is at a high level. Accordingly, the fifth switch transistor SW5 is turned on, and the voltage of the first voltage node VRD is provided to the overflow capacitor Cof through the reset node ND and the fifth switch transistor SW5. Accordingly, a charge in the overflow capacitor Cof is quickly drained to the first voltage node VRD. As a result, the reset speed of the overflow capacitor Cof may be improved. Afterward, at time T9, the drive transistor DX samples the voltage level of the second floating diffusion region FD2, which is electrically coupled to the overflow capacitor Cof, the first floating diffusion region FD1, and the third floating diffusion region FD3, and outputs (Vout) the sampled result as a reset level signal in the LCG mode of the small photodiode SPD.

Figure 12:
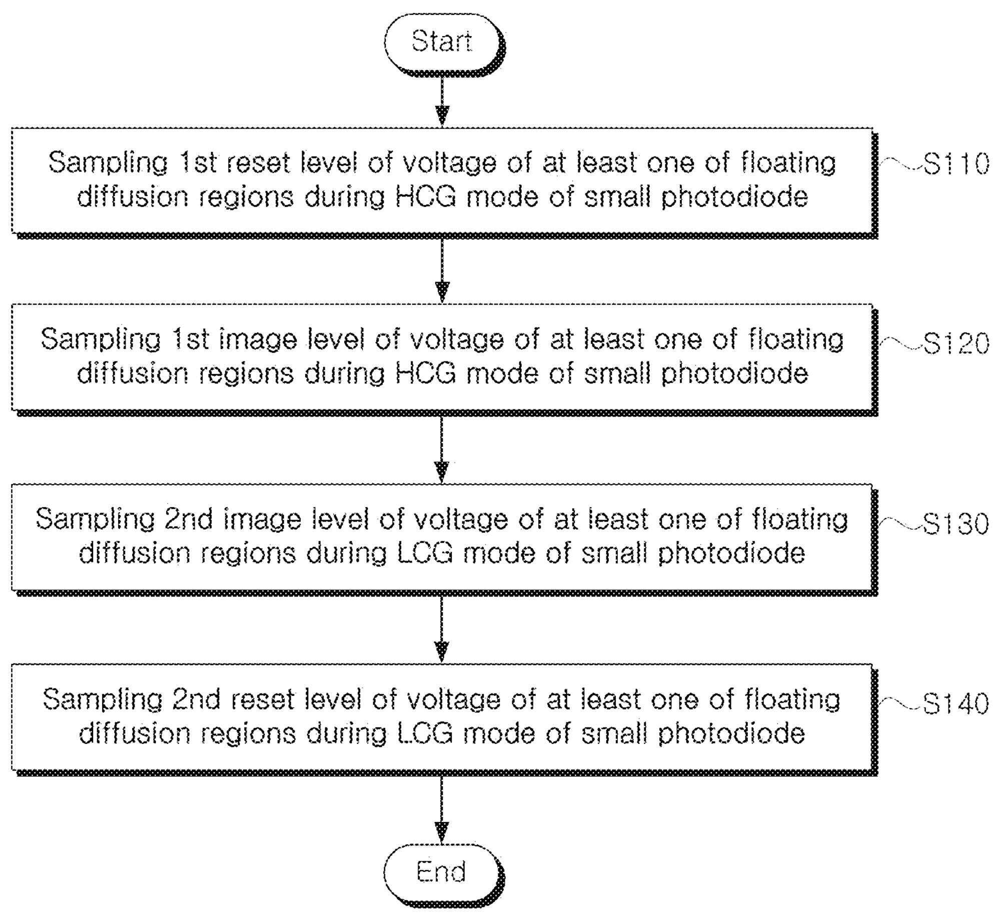
FIG. 12 is a flowchart illustrating an operating method of an image sensor, according to an embodiment.

FIG. 12 is a flowchart illustrating an operating method of an image sensor, according to an embodiment. An image sensor may include the unit pixel 112 or the unit pixel 112_1 described with reference to FIG. 2 or 10. The unit pixel includes the large photodiode LPD and the small photodiode SPD, which have different sized receiving areas. Some charges of the small photodiode SPD may overflow into a capacitor due to high intensity incident light.

A unit pixel includes a plurality of floating diffusion regions. During the readout period of the small photodiode SPD, the plurality of floating diffusion regions are electrically coupled in a HCG mode and an LCG mode. The plurality of floating diffusion regions coupled to each other may be different in each mode.

A dual conversion gain mode for providing a high conversion gain and a low conversion gain may be supported for each photodiode LPD or SPD of a unit pixel. A reset voltage provided during a readout operation to the small photodiode SPD may be lower than a reset voltage provided during a readout operation to the large photodiode LPD.

In operation S110, the method includes sampling a first reset level of a voltage of at least one of the floating diffusion regions during the HCG mode of the small photodiode SPD. For example, the method may include sampling the first reset level signal of at least one of the floating diffusion regions, which is reset to a voltage of a first voltage node providing a low voltage among a plurality of voltage nodes in the HCG mode during a readout period of the small photodiode SPD.

In operation S120, the method includes sampling a first image level of a voltage of at least one floating diffusion region during the HCG mode of the small photodiode SPD. For example, the method may include sampling the first image level signal based on the voltage of at least one floating diffusion region among the plurality of floating diffusion regions in the HCG mode during the readout period of the small photodiode SPD.

In operation S130, the method includes sampling a second image level of a voltage of at least one floating diffusion region during LCG mode of the small photodiode SPD. For example, the method may include sampling the second image level signal of at least one floating diffusion region among the plurality of floating diffusion regions in the LCG mode during the readout period of the small photodiode SPD.

In operation S140, the method includes sampling a second reset level of a voltage of at least one floating diffusion region during the LCG ode of the small photodiode SPD. For example, the method may include sampling a second reset level signal of at least one floating diffusion region reset to a voltage of the first voltage node providing a low voltage in the LCG mode during a readout period of the small photodiode SPD.

Before sampling the first reset level signal and sampling the second reset level signal, the unit pixel may reset at least one floating area to the voltage of the first voltage node providing the low voltage.

Before or after the readout period of the small photodiode SPD, the unit pixel may perform the readout of the large photodiode LPD. During the readout of the large photodiode LPD, at least one floating diffusion region may be reset to a voltage of the second voltage node higher than a voltage of the first voltage node.

The first voltage node may be connected to the voltage provided by a regulator inside the image sensor, and the second voltage node may be connected to the voltage provided by the PMIC.

The above description refers to various detailed embodiments. Embodiments in which a design is changed simply or which are easily changed are included in the scope of the present disclosure as well as in the scope of an embodiment described above. Technologies that are easily changed and implemented by using the above embodiments may be included in the scope of the present disclosure.

According to an embodiment, an image sensor including a split photodiode may reduce noise of an image.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image sensor comprising:

a first photoelectric element having a first receiving area;

a second photoelectric element having a second receiving area that is larger than the first receiving area of the first photoelectric element;

a first floating diffusion region in which charges generated by the first photoelectric element are stored;

a second floating diffusion region, in which charges generated by the second photoelectric element are stored, and which is connected to a gate of a driving transistor;

a capacitor selectively connected to the first floating diffusion region based on a readout mode and configured to store charges overflowing from the first photoelectric element;

a third floating diffusion region connected to the first floating diffusion region and the second floating diffusion region through a first switch transistor and a second switch transistor, respectively; and a reset transistor, a first end of which is selectively connected to one of a plurality of voltage nodes through a reset node, and a second end of which is connected to the third floating diffusion region.

2. The image sensor of claim 1, wherein the plurality of voltage nodes provide different voltages.

3. The image sensor of claim 1, wherein the second floating diffusion region and the third floating diffusion region are reset to different voltage levels during a readout period of the first photoelectric element and a readout period of the second photoelectric element, respectively.

4. The image sensor of claim 1, wherein the plurality of voltage nodes include a first voltage node and a second voltage node, and wherein a voltage provided by the first voltage node is lower than a voltage provided by the second voltage node.

5. The image sensor of claim 4, wherein, during at least one section of a readout period of the first photoelectric element, the reset node is connected to the first voltage node.

6. The image sensor of claim 4, wherein, after a sensing level signal of a low conversion gain (LCG) mode is output during a readout period of the first photoelectric element, the reset node provides the voltage of the first voltage node to at least one of the first floating diffusion region, the second floating diffusion region, and the third floating diffusion region.

7. The image sensor of claim 4, wherein, in at least one section of a low conversion gain (LCG) mode during a readout period of the first photoelectric element, the reset node provides the voltage of the first voltage node to the third floating diffusion region in a state in which the capacitor, the first floating diffusion region, the second floating diffusion region, and the third floating diffusion region are coupled together.

8. The image sensor of claim 4, wherein, in at least one section of a high conversion gain (HCG) mode during a readout period of the first photoelectric element, the reset node provides the voltage of the first voltage node to the third floating diffusion region in a state where the first floating diffusion region, the second floating diffusion region, and the third floating diffusion region are coupled together.

9. The image sensor of claim 4, wherein, during a readout period of the second photoelectric element, the reset node is connected to the second voltage node.

10. The image sensor of claim 4, wherein the first voltage node receives a voltage from a power management integrated circuit (PMIC), and the second voltage node receives a voltage from a regulator inside the image sensor.

11. The image sensor of claim 1, wherein the reset node is connected to each of the plurality of voltage nodes through a plurality of reset switches respectively, and wherein the plurality of reset switches are turned on respectively in different time sections during a readout period.

12. The image sensor of claim 4, wherein the first voltage node is a mesh structure.

13. The image sensor of claim 1, further comprising:

a switch element configured to connect one end of the capacitor to the reset node.

14. The image sensor of claim 13, wherein, in at least one section of an LCG mode during a readout period of the first photoelectric element, in a state in which the capacitor, the first floating diffusion region, the second floating diffusion region, and the third floating diffusion region are coupled together, the switch element is turned on while a voltage of a voltage node, which provides a low voltage from among the plurality of voltage nodes, is provided to the third floating diffusion region.

15. An operating method of an image sensor including a pixel, the pixel including a first photoelectric element, a second photoelectric element having a receiving area larger than a receiving area of the first photoelectric element, a plurality of floating diffusion regions, and a plurality of voltage nodes, the method comprising:

in a high conversion gain (HCG) mode during a readout period of the first photoelectric element, sampling a first reset level signal of at least one of the floating diffusion regions, which is reset to a voltage of a first voltage node providing a low voltage among the plurality of voltage nodes;

in the HCG mode during the readout period of the first photoelectric element, sampling a first image level signal of the at least one of the floating diffusion regions;

in a low conversion gain (LCG) mode during the readout period of the first photoelectric element, sampling a second image level signal of the at least one of the floating diffusion regions; and in the LCG mode during the readout period of the first photoelectric element, sampling a second reset level signal of the at least one of the floating diffusion regions, which is reset to the voltage of the first voltage node, wherein, during the readout period of the first photoelectric element, the plurality of floating diffusion regions are electrically coupled differently in the HCG mode and the LCG mode.

16. The method of claim 15, further comprising:

before sampling the first reset level signal, resetting the at least one of the floating diffusion regions to the voltage of the first voltage node; and before sampling the second reset level signal, resetting the at least one of the floating diffusion regions to the voltage of the first voltage node.

17. The method of claim 15, further comprising:

in a section of at least part of a readout period of the second photoelectric element, resetting the at least one of the floating diffusion regions to a voltage of a second voltage node that provides a higher voltage than the voltage of the first voltage node.

18. The method of claim 17, wherein the first voltage node is connected to a voltage provided by a regulator inside the image sensor, and the second voltage node is connected to a voltage provided by a PMIC.

19. The method of claim 15, wherein, during the readout period of the first photoelectric element and a readout period of the second photoelectric element, the plurality of voltage nodes respectively provide reset voltages of different levels to the at least one of the floating diffusion regions in different sections.

20. An electronic device comprising:

a pixel array in which a plurality of pixels are arranged; and a control circuit configured to transmit a control signal to a plurality of transistors included in a pixel of the plurality of pixels, wherein the pixel includes:

a first photoelectric element having a first receiving area;

a second photoelectric element having a second receiving area larger than the first receiving area of the first photoelectric element;

a first floating diffusion region in which charges generated by the first photoelectric element are stored;

a second floating diffusion region, in which charges generated by the second photoelectric element are stored, and which is connected to a gate of a driving transistor;

a capacitor selectively connected to the first floating diffusion region based on a readout mode and configured to store charges overflowing from the first photoelectric element;

a third floating diffusion region connected to the first floating diffusion region and the second floating diffusion region through a first switch transistor and a second switch transistor, respectively; and a reset transistor, a first end of which is selectively connected to one of a plurality of voltage nodes through a reset node, and a second end of which is connected to the third floating diffusion region.

* * * * *